W. M. WISE & R. C. MICHAELS.
ANTISKID TREAD FOR TIRES.
APPLICATION FILED MAY 12, 1914.
1,127,339.
Patented Feb. 2, 1915.
2 SHEETS—SHEET 1.
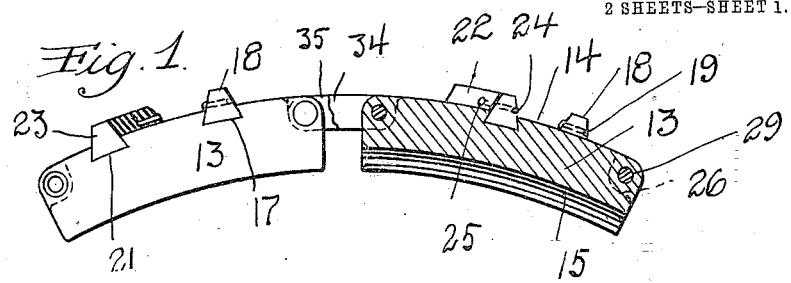
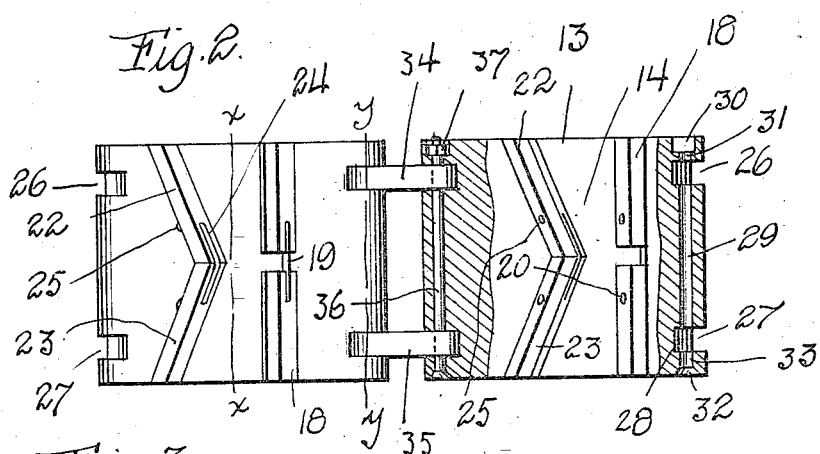
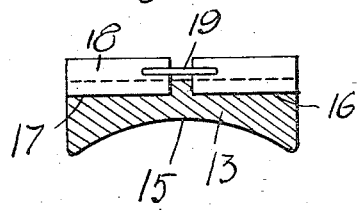
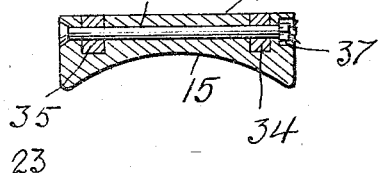
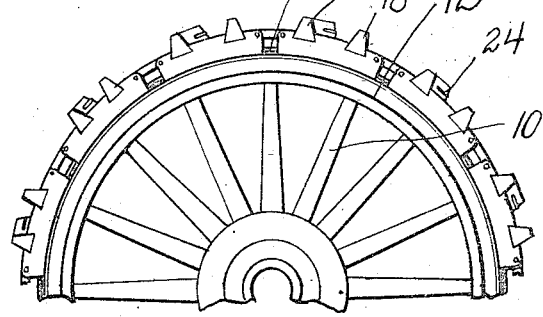
WITNESSES
Samuel Payne
Max H. Srolovitz
INVENTORS
W. M. Wise and
R. C. Michaels
By Henry C. Evert
ATTORNEY

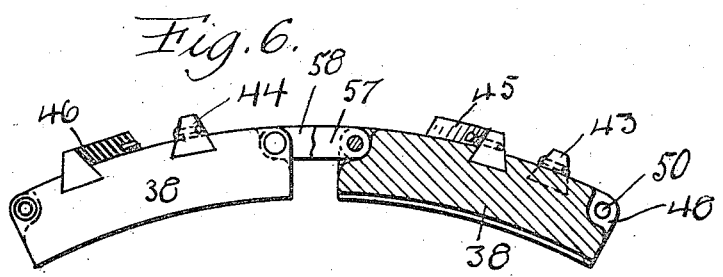
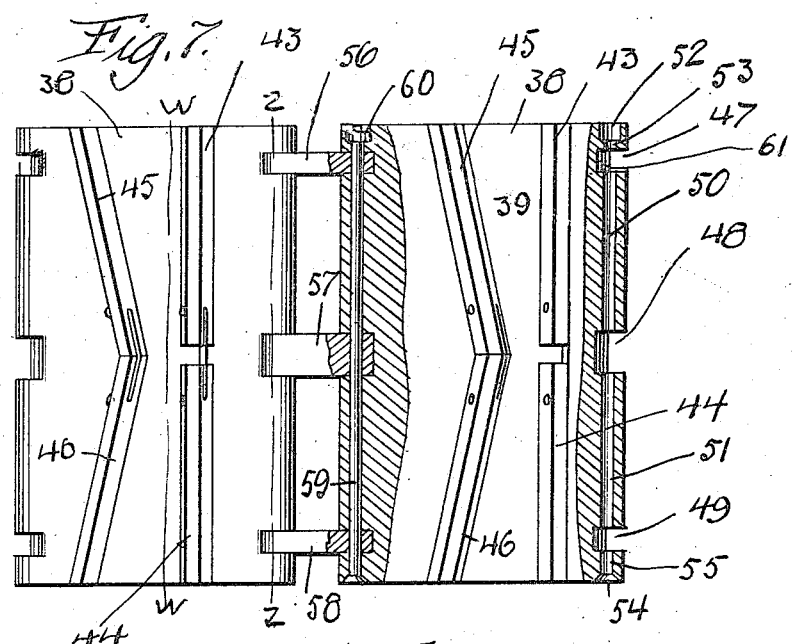
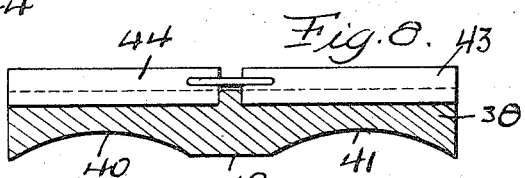
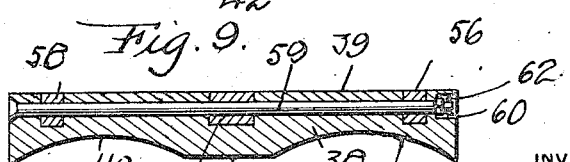

UNITED STATES PATENT OFFICE.

WILLIAM M. WISE, OF YOUNGSTOWN, OHIO, AND RAYMOND C. MICHAELS, OF PITTSBURGH, PENNSYLVANIA.

ANTISKID-TREAD FOR TIRES.

1,127,339.  Specification of Letters Patent. Patented Feb. 2, 1915.

Application filed May 12, 1914. Serial No. 838,064.

*To all whom it may concern:*

Be it known that we, WILLIAM M. WISE and RAYMOND C. MICHAELS, citizens of the United States of America, residing at Youngstown and Pittsburgh, in the counties of Mahoning and Allegheny and States of Ohio and Pennsylvania, respectively, have invented certain new and useful Improvements in Antiskid-Treads for Tires, of which the following is a specification, reference being had therein to the accompanying drawing.

This invention relates to anti-skid treads for tires, more particularly solid resilient tires, and has for its object to provide a device of such class, in a manner as hereinafter set forth, to reduce, when in operative position upon the tire, the skidding of a wheel to a minimum, and to further increase traction of the wheel when traveling over a slippery, sandy, muddy or soft road surface.

Although the anti-skid tread is designed primarily for use in connection with solid resilient tires, yet it is understood that it can me employed for pneumatic tires, or for any other purposes wherein it is found applicable.

A further object of the invention is to provide, in a manner as hereinafter set forth, an anti-skid tread for solid resilient tires for increasing the life of the latter.

Further objects of the invention are to provide an anti-skid tread which is simple in its construction and arrangement, readily applied circumferentially of the tire, strong, durable, efficient in its use, formed of a series of separable elements whereby when one becomes damaged, it can be conveniently removed and a new one substituted, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—Figure 1 is an elevation, partly in section, of a plurality of teeth carrying elements; Fig. 2 is a top plan view, partly in section, of a plurality of teeth carrying elements; Fig. 3 is a cross section of one of the teeth carrying elements on line X—X Fig. 2; Fig. 4 is a cross sectional view of one of the teeth carrying elements on line Y—Y Fig. 2; Fig. 5 is an elevation of a portion of the wheel, showing the adaptation therewith of an anti-skid tread in accordance with this invention, the tread being employed with what is termed a single tire; Fig. 6 is a side elevation, partly in section, of a plurality of teeth carrying elements of the form employed in connection with a double tire. Fig. 7 is a top plan view, partly in section, of the form shown in Fig. 6; Fig. 8 is a cross sectional view of one of the teeth carrying elements on line W—W Fig. 7; and, Fig. 9 is a cross sectional view of one of the teeth carrying elements on line Z—Z Fig. 7.

Referring to Figs. 1 to 5 of the drawings, in which is illustrated an anti-skid tread of a form employed in connection with a single tire, 10 denotes a wheel, 11 a tire, and 12 a rim in which is seated the tire 11, the latter being of the solid resilient class. Extending circumferentially of the tire 11 is an anti-skid tread in accordance with this invention, and which consists of a series of teeth carrying elements pivotally connected together and tightly embracing the tire 11 to prevent circumferential movement of the anti-skid tread when the latter is in operative position with respect to the tire 11. Each of the teeth carrying elements consists of a metallic body 13, preferably constructed of malleable metal. The body 13 is segment-shaped in longitudinal section and its length is greater than its width. The upper face of the body 13 is plane in transverse section, as indicated at 14, and the lower face of said body 13, as at 15, conforms in contour to the shape of the outer face of the tire 11, and as illustrated, the lower face of said body 15 is convex in cross section. The upper face of the body 13, between the transverse center and the one end thereof, is formed with a pair of oppositely disposed and transversely extending pockets 16—17, which terminate at one side of the longitudinal center of the upper face of said body 13. The pockets 16—17 are dove-tailed in cross section, and mounted in each of said pockets 16—17, and abutting against the inner walls thereof, is a tooth 18 which is wedge-shaped in vertical section. The inner ends of the teeth 18 are spaced from each other, and the said inner ends are connected together by a staple 19. The free ends of the arms of the staple 19 are positioned as at 20 whereby the staple 19 is fixedly secured to the teeth 18, and as the inner ends of said teeth are connected together by the staple 19, it is obvious that transverse movement of the teeth is arrested. The teeth 18 are constructed of hard metal, preferably high speed steel, which makes said teeth durable, and owing to the manner of setting up the teeth 18, it is obvious that when one becomes damaged, it can be conveniently disconnected from the other tooth and a new one substituted, and the teeth then connected together by a staple. The upper face of the body 13, between its transverse center and the other end thereof, is provided with a V-shaped groove 21, which extends from one side of the body 13 and terminates at the other side, and the apex of the said groove is positioned in proximity to the transverse center of the body 13. The groove 21 is dove-tailed in vertical section, and seated in said groove 21 is a pair of teeth 22, 23, which abut at their inner ends. The teeth 22—23 are wedge-shaped in vertical section and have their inner ends connected together by a staple 24, the arms of the latter extending through the teeth, and the free ends of said arms are positioned as at 25 whereby the inner ends of the teeth 22—23 are connected together and transverse movement of said teeth is arrested. The teeth 22—23 are constructed of hard metal, particularly high speed steel, and owing to the manner in which they are set up with respect to the body 13, it is obvious that if one of the teeth become damaged it can be conveniently removed and a new one stapled in position. The body portion 13 at each end is provided with a pair of notches 26—27, and the inner wall of each of said notches is rounded at 28 to provide a bearing. Extending from the notch 26 to the notch 27 is a transversely extending opening 29. Arranged in one side, at each end of the body 13 is a pocket 30, and extending from the pocket 30 and opening into the notch 26 is an opening 31 which registers with the opening 29. The other side of the body 13, at each end thereof, is formed with a countersink 32, and leading from said countersink 32, to the notch 27, is an opening 33 which is in alinement with the opening 29. The notches 26—27 of one body 13 oppose the notches 26—27 of adjacent bodies 13, and the said bodies 13 are connected together by a pair of links 34—35 which extend in opposing notches 26 and opposing notches 27. The links 34—35 are pivotally connected to the bodies 13 through the medium of transversely extending headed coupling bolts 36 which are provided on one end with nuts 37. Each bolt extends through the openings 29—31, and 33, has its head seated in a countersink 32, and projects in a pocket 30, and within the pocket 30 is positioned the nut 37. By coupling up the bodies 13 in the manner as stated, if one should be damaged, it can be conveniently removed and a new one substituted.

Referring to Figs. 6 to 9 of the drawings, the teeth carrying elements each consist of a metallic body 38, preferably constructed of malleable material, each of the bodies 38 is segment-shaped in contour, and, in transverse section, the upper face of the body is flat as indicated at 39. The lower face of the body is provided with a pair of convex grooves 40—41 for the reception of the upper face of a solid resilient double tire, the intermediate portion 42 of the lower face extending between the tires. The upper face of each of the bodies 38 is provided with teeth 43, 44, 45 and 46 of the same construction and arrangement as set forth with respect to the teeth 18, 22 and 23. Each end of the body 38 is provided with a series of notches 47—48 and 49. The notch 48 is of greater width than either of the notches 47—49. Leading from the notch 48 to the notch 47 is an opening 50, and leading from the notch 48 to the notch 49 is an opening 51. One side of the body 38, near each end, is provided with a pocket 52, and leading from the latter to the notch 47 is an opening 53 which alines with the opening 50, the latter alining with the opening 51. The other side of the body 38, at each end, is provided with a countersink 54, and leading from the latter to the notch 49 is an opening 55 which registers with the opening 51. The bodies 38 are connected together by sets of links, each set consisting of three links as indicated at 56, 57 and 58. The link 57 is of greater width than either of the links 56—58. The notches 47—48 and 49 of one body 38 opposes the notches 47, 48 and 49 of adjacent bodies 38. The links 56 extend into opposing notches 47, the links 57 extend in opposing notches 48, and the links 58 extend in opposing notches 49. The links 56, 57 and 58 are pivotally connected to the bodies 38 through the medium of headed coupling bolts 59 carrying on one end nuts 60. Each bolt 59 extends through the openings 50, 51, 53 and 55. The head of the bolt is positioned in the countersink 54, and the other end projects into a pocket 52, and in the latter is arranged the nut 60, and in the latter is arranged the nut 60. The inner wall of each of the notches 47—48 and 49 is rounded as at 61 to provide a bearing. The ends of the bolts 36 which carry the nuts 37, and the ends of the bolts 59 which carry the nuts 60, are provided with cotter pins 62 for the purpose of maintaining the nuts 37 and 60 in position upon the bolts.

The anti-skid tread, prior to the positioning of the same upon the tire, is formed of a single length, and after being arranged circumferentially of the tire, the ends are drawn together through the medium of a suitable clamping device, and when the ends have been properly positioned, the said ends are connected together by the links and bolts.

The teeth are termed gripping elements to prevent skidding and to increase traction.

What we claim is:—

1. A tread member having relatively angular under cut grooves, calk members dove tailed in said grooves and a connector between the calk members.

2. A tread member having relatively angular undercut grooves, open at the sides of the tread member, calk members dove tailed in said grooves and a connector between the ends of the calk members remote from said sides.

3. A tread member having separated grooves extending in the same direction, calk members secured in said grooves against motion longitudinally to the tread member, and a connector between said calk members over the part of the tread member body separating the grooves.

4. A tread member having alined separated grooves, calk members secured in the grooves, and connecting means between the calk members and overlying the part of the tread member body separating the grooves.

In testimony whereof we affix our signatures in the presence of two witnesses.

WILLIAM M. WISE.
RAYMOND C. MICHAELS.

Witnesses:
MAX H. SROLOVITZ,
L. DUNN.